United States Patent Office 3,097,218
Patented July 9, 1963

3,097,218
SULFONATES OF HYDROXYALKYL ESTERS OF TERTIARY ALKANOIC ACIDS
Pieter L. Kooijman and Hendrik Buesink, Amsterdam, Netherlands, assignors to Shell Oil Company, New York, N.Y., a corporation of Delaware
No Drawing. Filed Dec. 14, 1961, Ser. No. 159,443
Claims priority, application Netherlands Dec. 30, 1960
17 Claims. (Cl. 260—400)

This invention relates to surface active compounds and compositions and to their production. The invention relates more particularly to novel sulfonates of hydroxyalkyl esters of tertiary alkanoic acids and novel surface active compositions comprising sulfonates of hydroxyalkyl esters of tertiary alkanoic acids as well as to the method of their production.

It is known to produce certain surface active compounds by the reaction of a salt of a fatty acid with a halogen-substituted alkyl sulfonate. The resulting products are herein referred to as alkyl ester sulfonates. These products, as obtained heretofore by such procedure, vary considerably in characteristics desired in surface active compositions intended for practical utility. Often they are lacking in a satisfactory degree of stability, particularly with respect to resistance to hydrolysis, and in wetting capacity, foaming power, and the like.

It is, therefore, an object of the present invention to provide improved surface active compounds consisting essentially of novel sulfonates of hydroxy alkyl esters of tertiary alkanoic acids, and a method for their production.

Another object of the invention is the provision of improved surface active compositions comprising novel sulfonates of hydroxy alkyl esters of tertiary alkanoic acids, and the method of their production.

Still another object of the present invention is the provision of a process for the production of novel compounds and compositions comprising tertiary alkanoic acid esters of alkyl sulfonic acids and salts thereof.

A specific object of the invention is the provision of improved surface active compositions comprising novel hydroxy propyl ester sulfonates derived from tertiary alkanoic acids. Other objects and advantages of the present invention will become apparent from the following detailed description thereof.

In accordance with the invention novel surface active compounds and compositions are produced by reacting a salt of an alkane carboxylic acid having a quaternary carbon atom in alpha position with respect to the carbon atom in the carboxyl group with a salt of a halogen-substituted aliphatic sulfonic acid.

In one embodiment of the invention novel surface active compounds and compositions consisting essentially of hydroxy-substituted alkyl ester sulfonates are produced by the reaction of a salt of an alkane carboxylic acid having a quaternary carbon atom in alpha position with respect to the carboxyl carbon atom with a halogen-substituted hydroxyalkyl sulfonate.

Essential to the attainment of the objects of the invention is the use as the alkane carboxylic acid salt reactant a salt of an alkane carboxylic acid having a quaternary carbon atom in alpha position to the carboxyl group, that is containing a quaternary carbon atom directly linked by carbon to carbon bond to the carbon atom of the carboxyl group. Suitable of this class, referred to herein as salts of tertiary carboxylic acids comprise those represented by the general formula:

wherein $R^1$, $R^2$ and $R^3$ each represent an alkyl group, Me represents a metal selected from the group consisting of the alkali metals and alkaline earth metals. Me typically represents sodium, potassium, lithium, calcium, barium, magnesium, and the like. Particularly useful are the alkali metal representations and especially sodium. $R^1$, $R^2$ and $R^3$ each represent the same or a different alkyl group such as, for example, methyl, ethyl, propyl, butyl, pentyl, hexyl, heptyl, decyl, etc.; they may be of straight chain or branched structure. The suitable tertiary monocarboxylic acids contain at least five carbon atoms. Particularly preferred tertiary alkanoic acids whose salts are used as starting materials in the process of the invention are those containing from about 7 to about 21 carbon atoms. The tertiary alkanoic acids may be referred to as trialkyl-substituted acetic acids. Examples of acids of this type whose salts are employed include trimethyl acetic acid, dimethyl ethyl acetic acid, tributyl acetic acid, propyl diamyl acetic acid, triamyl acetic acid, dihexyl heptyl acetic acid, and the like.

The suitable monocarboxylic acids whose carboxyl group is linked to a quaternary carbon atom may be obtained from any suitable source. Excellent results are obtained with tertiary monocarboxylic acids prepared by reacting aliphatic hydrocarbons with formic acid or with carbon monoxide and water. In this reaction the aliphatic hydrocarbons that are of primary interest are olefins. The reaction is executed in liquid phase at a temperature in the range of from about −25 to about 100° C. and at relatively low pressures, for example, in the range of from about 20 to about 150 atmospheres. Suitable methods for preparing the tertiary monocarboxylic acids are disclosed in U.S. Patent 2,876,241 and in copending applications Serial Nos. 858,609; 858,796; and 858,797, filed December 10, 1959, which matured into U.S. Patents 3,059,004; 3,059,005 and 3,059,006, respectively. Suitable olefinic charge materials thus reacted with carbon monoxide and water to produce tertiary monocarboxylic acids comprise commercially available unsaturated hydrocarbons predominating in monoolefins such as, for example, branched or unbranched pentenes, hexenes, heptenes, octenes, nonenes, decenes and higher alkenes; polymers and copolymers of such alkenes, such as diisobutylene, propylene-dimer, -trimer and -tetramer, isobutylene trimer; cyclic alkenes, such as cyclopentene and cyclohexene; etc. Commercially available mixtures comprising these alkenes are also used, for example, olefin-containing hydrocarbon fractions such as obtained by thermal vapor phase cracking of paraffin wax in the presence of steam. Olefin-rich products obtained in the Fischer-Tropsch synthesis carried out under moderate pressure also constitute examples of a suitable source of the alpha-branched monocarboxylic acids. Monoolefins preferably employed in the production of the carboxylic acids comprise those having from about six to about twenty carbon atoms to the molecule.

Another method of producing suitable tertiary monocarboxylic acids comprises that relying upon the reaction of saturated hydrocarbons with carbon monoxide and water in the presence of a hydrogen acceptor as described and claimed in copending application Serial No. 141,287, filed September 28, 1961.

Other methods enabling the production of the suitable alkanoic acids consisting of tertiary alkanoic acids comprise those disclosed and claimed in U.S. Patents 2,913,489; 2,913,491; and in copending U.S. application Serial No. 761,376, filed September 16, 1958, which matured into U.S. Patent 3,047,622. Still another method comprises the reaction of olefins with metal carbonyls, for example, nickel carbonyl, known as the "Reppe" method. It is to be understood that the invention is not limited with respect to the source of the suitable tertiary alkanoic acids whose salts are used as starting materials in the process of the invention.

The salts of these tertiary acids such as, for example, the alkali-metal and alkaline earth metal salts thereof, are readily prepared by conventional means. Thus, the alkali metal salts of the suitable tertiary acid, such as a tertiary alkanoic monocarboxylic acid, is prepared by reacting the acid with an approximately stoichiometric amount of an alkali metal hydroxide, e.g., sodium hydroxide, potassium hydroxide, lithium hydroxide or the like. Preferred salts are the sodium and potassium acid salts.

The tertiary monocarboxylic acid salt component of the charge to the process of the invention may consist of a single such salt or a mixture of two or more such salts. Excellent results in the production of surface active compositions are obtained when employing as the tertiary carboxylic acid salt component a mixture of the above defined salts of tertiary carboxylic acids having from about 7 to about 21 carbon atoms to the molecule and preferably from about 15 to about 16 or about 17 to about 18 carbon atoms to the molecule.

In accordance with the process of the invention the above-defined salts of tertiary monocarboxylic acids are reacted with a member of the group consisting of salts of halogen-substituted aliphatic sulfonic acids and halogen-substituted hydroxy aliphatic sulfonic acids. Suitable halogen-substituted aliphatic sulfonic acid salts and hydroxyl derivatives thereof comprise those represented by the general formula

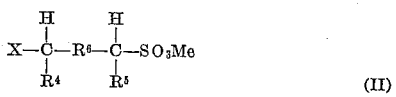

(II)

wherein:

$R^4$ and $R^5$ each represent alkyl, hydroxy alkyl or hydrogen, $R^6$ represents alkylene or hydroxy alkylene of 1 to 8 carbons, The sum total of the carbon atoms in $R^4+R^5+R^6$ has a value from 1 to about 20, Me is a member of the group consisting of the alkali and alkaline earth metals, and X is a halogen, preferably chlorine.

In the foregoing Formula II, Me can be sodium, potassium, lithium, calcium, barium, magnesium, and the like. Compounds wherein Me is sodium or potassium are particularly preferred. When $R^4$ and/or $R^5$ are alkyl they may, for example, be methyl, ethyl, propyl, butyl, pentyl, octyl, decyl, etc. The lower alkyl groups are somewhat preferred. Examples of such suitable halogen-substituted aliphatic sulfonic acid salts include the alkali metal salts, such as the sodium salts of 3-chloro-propanesulfonic acid, 3-chloro-3-methyl-propanesulfonic acid, 3-chloro-4-ethyl-propanesulfonic acid, 4-chloro-butanesulfonic acid, 4-chloro-4-methyl butanesulfonic acid, their homologs and analogs. Examples of suitable halogen substituted hydroxy aliphatic sulfonic acid salts include the alkali metal and alkaline earth metal salts, such as the sodium salts of 3-chloro-2-hydroxypropane sulfonic acid-1; 3-chloro-1-hydroxypropane sulfonic acid-1; 4-chloro-2-hydroxybutane sulfonic acid-1; 1-chloro-2-hydroxybutane sulfonic acid-4; 5-chloro-2-hydroxypentane sulfonic acid, their homologs and analogues.

Preferred are the chloro-substituted hydroxy alkane sulfonic acids wherein the hydroxyl group and the sulfonate group are attached to adjacent carbon atoms. A particularly preferred class of starting materials suitable for reaction with the tertiary monocarboxylic acids in accordance with the invention comprises the alkali and alkaline earth metal salts, such as the sodium salts, of the halo-substituted hydroxypropanesulfonic acids, referred to herein as the halohydrin sulfonic acids. These comprise, for example, the chlorohydrin sulfonic acids, 3-chloro-2-hydroxypropane sulfonic acid-1, 3-chloro-1-hydroxypropane sulfonic acid-2 and their alkyl substituted derivatives.

The suitable salts of the halogen-substituted hydroxy alkyl sulfonic acids containing a hydroxyl group and a sulfonate group attached to adjacent carbon atoms, as in the salts of the halohydrin sulfonic acids, are readily obtained by reacting the corresponding halo-substituted alkyl-1,2-epoxide with alkali bisulfite or alkali metal bisulfite. Reaction of the halo-epoxy alkane with the suitable bisulfite may be carried out by passing the halo-epoxy alkane into a concentrated solution of the bisulfite at an elevated temperature. When epichlorohydrin and sodium bisulfite are the reactants, a 20% bisulfite solution and a temperature of about 80° C., readily result in reaction products comprising the sodium salts of 3-chloro-2-hydroxypropane sulfonic acid-1 and 3-chloro-1-hydroxypropane sulfonic acid-2.

Reaction of the salts of the tertiary monocarboxylic acids with the halogen-substituted aliphatic sulfonate is brought about by heating their admixtures at a temperature of from about 50 to about 250° C., and preferably from about 100° to about 200° C. The reaction is preferably carried out in the absence of any substantial amount of water. A solvent or diluent is preferably employed. Suitable solvents comprise the amides and substituted amides, or mixtures thereof, derived from monocarboxylic acids such as of the formula

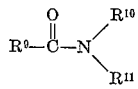

wherein $R^9$ is alkyl, aryl, or hydroxy alkyl and $R^{10}$ and $R^{11}$ are selected from the group consisting of hydrogen, alkyl, aryl, and hydroxy alkyl and alkylene joined through an oxygen atom; the said solvents being such that they do not enter into reaction and which are substantially volatilized at a temperature below that in which harmful decomposition products are formed in the reaction mixture, such as, for example, a temperature not substantially above about 200° C. A preferred solvent, however, is dimethyl formamide which is readily distilled from the resulting reaction mixture upon completion of the reaction.

The process may be carried out under subatmospheric, atmospheric or superatmospheric pressures. In general, the use of substantially atmospheric or slightly superatmospheric pressure up to, for example, about 50 p.s.i.g. are generally preferred.

The duration of the reaction may vary widely within the scope of the invention. The time preferably employed will depend to some extent upon the specific reactants and conditions employed. In general, reaction times in the range of from about 30 minutes to about 10 hours have been found satisfactory. Longer or shorter reaction times may, however, be employed within the scope of the invention.

The salts of the tertiary monocarboxylic acids and the halogen-substituted aliphatic sulfonates are preferably reacted using equimolar amounts of the reactants. Either reactant may, however, be used in excess within the scope of the invention.

Inorganic halides, for example, sodium chloride, formed as by-products are readily separated from the resulting reaction mixture by one or more such steps as filtration, centrifuging or the like. The crude reaction products may be subjected to suitable recovery and purification steps comprising, for example, one or more such steps as, distillation, extraction, extractive distillation, adsorption, acid treatment, and the like. The crude product also lends itself to use as such in the production of derivative products and compositions including detergents, and the like.

Under the above-defined conditions the salts of the tertiary alkane monocarboxylic acids and the halogen-substituted aliphatic sulfonates will react with the formation of reaction products comprising sulfonate esters and hydroxy-substituted sulfonate esters represented by the formula:

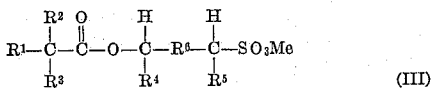

(III)

wherein $R^1$, $R^2$, $R^3$ and $R^4$, $R^5$, $R^6$ and Me have the same meaning as indicated herein above in the definition of Formulae I and II. The following examples are illustrative of the sulfonate esters and hydroxy sulfonate esters produced in accordance with the invention.

EXAMPLE I

Trimethyl acetic acid (pivalic acid) is produced by reacting tert-butyl alcohol in n-heptane solution with carbon monoxide in the presence of concentrated sulfuric acid at 20° C. and 500 p.s.i.g., and reacting the resulting reaction mixture with water. Trimethyl acetic acid is recovered from the resulting reaction mixture by distillation. The trimethyl acetic acid is converted to sodium trimethyl acetate by adding methanol and neutralizing the resulting methanolic trimethyl acetic acid with aqueous sodium hydroxide.

Sodium trimethyl acetate so obtained is combined with a substantially equimolecular quantity of -chloro-2-hydroxypropane sodium sulfonate. The resulting mixture is heated in the presence of added dimethyl formamide at a temperature of about 135° C. Upon completion of the reaction the mixture is filtered to remove sodium chloride and thereafter distilled to remove dimethyl formamide. There is thus obtained a reaction product consisting essentially of the sodium salt of the trimethyl acetic acid ester of 2,3-hydroxpyropane sulfonic acid

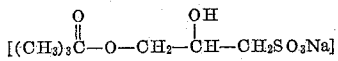

EXAMPLE II

Each compound in the following Table A, identified therein by a reference number, is obtained by reacting the tertiary carboxylic acid salt listed in Table B, identified therein by the same reference number as the product of Table A., with the halogen-substituted aliphatic sulfonate listed in Table C; also identified therein by the same reference number as the product of Table A. The numbered compound of Table B is heated in admixture with a substantially equimolecular quantity of similarly numbered compound of Table C, in a reaction medium consisting essentially of dimethyl formamide, at 130 to 150° C. until reaction is substantially complete. By-product inorganic salt is removed by filtration and dimethyl formamide distilled from the reaction mixture. The crude reaction product obtained comprises the compound of Table A identified by the same reference number as the reactants. The crude product is purified essentially as indicated in foregoing Example I.

Table A

| Ref. No. | Ester Product |
|---|---|
| 1 | Trimethyl acetic acid ester of 3-hydroxypropane sodium sulfonate. |
| 2 | Trimethyl acetic acid ester of 2,3-dihydroxypropane-2-sodium sulfonate. |
| 3 | 2,2-dipropylpentanoic acid ester of 4-hydroxybutane-1-sodium sulfonate. |
| 4 | 2,2-dimethylbutanoic acid ester of 3-hydroxy-1,3-dimethylpropane-1-sodium sulfonate. |
| 5 | 2,2-dimethyldecanoic acid ester of hydroxypentane potassium sulfonate. |
| 6 | 2-ethyl-2-methylheptanoic acid ester of 3,4-dihydroxybutane sodium sulfonate. |
| 7 | Trimethyl acetic acid ester of 2,5-dihydroxypentane-1-sodium sulfonate. |
| 8 | 2,2,4,4-tetramethylpentanoic acid ester of 6-hydroxy-2-ethylhexane-1-sodium sulfonate. |
| 9 | 2,2-diethylhexanoic acid ester of 2,3-dihydroxypentane-1-sodium sulfonate. |
| 10 | 2-ethyl-2-methylpentanoic acid ester of 2,4-dihydroxy-3-ethylbutane-1-sodium sulfonate. |
| 11 | 2-cyclohexyl-2-methylpropionic acid ester of 2,4-dihydroxybutane-1-lithium sulfonate. |

Table B

| Ref. No. | Salt of Tert. Monocarboxylic Acid Reactant |
|---|---|
| 1 | Sodium salt of trimethyl acetic acid. |
| 2 | Sodium salt of trimethyl acetic acid. |
| 3 | Sodium salt of 2,2-dipropylpentanoic acid. |
| 4 | Sodium salt of 2,2-dimethylbutanoic acid. |
| 5 | Potassium salt of 2,2-dimethyldecanoic acid. |
| 6 | Sodium salt of 2-ethyl-2-methylheptanoic acid. |
| 7 | Sodium salt of trimethyl acetic acid. |
| 8 | Sodium salt of 2,2,4,4-tetramethylpentanoic acid. |
| 9 | Sodium salt of 2,2-diethylhexanoic acid. |
| 10 | Sodium salt of 2-ethyl-2-methylpentanoic acid. |
| 11 | Lithium salt of 2-cyclohexyl-2-methylpropionic acid. |

Table C

| Ref. No. | Halo-Substituted Aliphatic Sulfonate Salt Reactant |
|---|---|
| 1 | 3-chloropropane-1-sodium sulfonate. |
| 2 | 3-chloro-1-hydroxypropane-2-sodium sulfonate. |
| 3 | 4-chloro-butane-1-sodium sulfonate. |
| 4 | 3-chloro-1,3-dimethylpropane-3-sodium sulfonate. |
| 5 | 5-bromopentane potassium sulfonate. |
| 6 | 4-chloro-3-hydroxybutane-1-sodium sulfonate. |
| 7 | 5-chloro-2-hydroxypentane-1-sodium sulfonate. |
| 8 | 6-chloro-2-ethylhexane-1-sodium sulfonate. |
| 9 | 3-chloro-2-hydroxypropane-1-sodium sulfonate. |
| 10 | 4-chloro-2-hydroxy-3-ethylbutane-1-sodium sulfonate. |
| 11 | 4-chloro-2-hydroxybutane-1-lithium sulfonate. |

The ester sulfonate products of the invention are further exemplified by the following, which are obtained as indicated herein above by reacting the appropriate tertiary monocarboxylic acid salts with the appropriate halo-substituted sulfonate.

The alkaline earth metal salts and alkali metal salts, such as, for example, the sodium, potassium, calcium, lithium or magnesium salts of:

Trimethyl acetic acid ester of 2,3-dihydroxypropane sulfonic acid.

Trimethyl acetic acid ester of 2,4-dihydroxybutane sulfonic acid.

Diethyl acetic acid ester of 2,3-dihydroxy-1,3-dimethylpropane sulfonic acid.

Tributyl acetic acid ester of 2,3-dihydroxypropane sulfonic acid.

Trimethyl acetic acid ester of 10-hydroxyundecane-10-sulfonic acid.

2-ethyl-2-n-butyl decanoic acid ester of 2,3-dihydroxypropane sulfonic acid.

These sulfonate esters and hydroxy-substituted sulfonate esters define a special class having a quaternary carbon atom in the alpha position with respect to the acyl group. It is the presence of the alpha positioned quaternary carbon atom to which are attributed at least in part advantageous characteristics peculiar to the sulfonate esters, and hydroxy-substituted sulfonate esters, obtained in the process of the invention. A preferred group of hydroxy-substituted sulfonate esters of the tertiary alkane monocarboxylic obtained in accordance with the invention comprise those containing a hydroxyl group and the sulfonate (—SO₃Me) group each linked to adjacent carbon atoms. Comprised in this preferred group are the ester sulfonates derived from the above-defined tertiary alkane monocarboxylic acids and their alkyl derivatives, such as, for example:

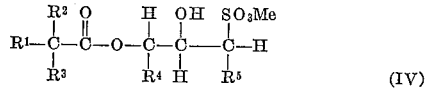

(IV)

and

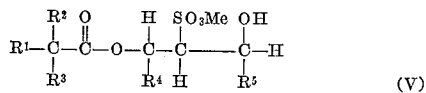

(V)

wherein $R^1$, $R^2$, $R^3$ and $R^4$, $R^5$ and Me have the meaning as indicated herein above in the definition of compounds of Formulae I and II.

Compositions particularly valuable because of their characteristics and utility in the production of detergents comprise the mixtures of sulfonate esters of the present invention derived from chosen specific admixtures of the above-defined tertiary alkane monocarboxylic acids. Particularly preferred are mixtures of hydroxy-substituted sulfonate esters, including the hydroxy propane sulfonate esters and alkyl-substituted derivatives thereof, derived from admixed tertiary alkane monocarboxylic acids having from about 7 to about 21 carbon atoms to the molecule. Characteristics of the composition within this defined class may be controlled to obtain specifically desired modifications by controlling the specific molecular range of the admixture of tertiary carboxylic acid salt starting materials. Thus, compositions possessing particularly desired characteristics with respect to surface activity in various forms of modifications comprise hydroxy-substituted sulfonate ester compositions of the present inventions as the following: admixtures of the sodium salts of tertiary alkane monocarboxylic acid esters of 1,2-dihydroxypropane sulfonic acid derived from admixed tertiary alkane monocarboxylic acids having fifteen to sixteen carbon atoms to the molecule and having a boiling range of from about 320 to about 340° C. and an average molecular weight of about 255; admixture of sodium salts of tertiary alkane monocarboxylic acid esters of 1,2-dihydroxypropane sulfonic acid derived from admixed tertiary alkane monocarboxylic acids having from eighteen to nineteen carbon atoms to the molecule, boiling in the range of from about 350° to about 370° C. and having an average molecular weight of about 293; the composition consisting essentially of sodium salts of tertiary alkane monocarboxylic acid esters of 1,2-dihydroxypropane sulfonic acid derived from tertiary alkane monocarboxylic acids predominating in acids having about seventeen carbon atoms to the molecular, boiling in the range of from about 335 to about 350° C. and having an average molecular weight of about 275.

Comprised within the broad scope of the invention are compounds represented by the foregoing Formulae III, IV and V, as well as their production from materials represented by Formulae I and II, wherein Me designates broadly a cation imparting water solubility to the product. Me may be H or $NH_4^+$.

The sulfonate esters and hydroxy sulfonate esters produced in accordance with the present invention are of value because of their high wetting capacity and excellent foaming power. Their depressant action towards lime soap is outstanding rendering them admirably suited for use in hard water. Their properties render them eminently suitable for use as components of detergent compositions and as textile assistants that must have good wetting effect as well as cleansing properties. A particularly advantageous characteristic of the productions obtained in the process of the invention is their unusually high resistance to hydrolysis.

The products of the process of the invention furthermore are of value as flotation agents, alkylating agents, tanning agents, and as intermediate and starting materials in the production of valuable chemical derivatives therefrom.

The sulfonate esters and hydroxy-substituted sulfonate esters produced in accordance with the invention may be combined with components enhancing or modifying their properties for use as detergents or cleansing agents. Thus, they may have added thereto such materials as other surface-active compounds, alkali pyrophosphates or polyphosphates, silicates, carbonates, sulphates, borates, sodium carboxymethyl cellulose or other solubble derivatives of cellulose or starch, persulphates, perborates, percarbonates, optical bleaching agents, foaming agents, foam stabilizers, and the like.

The following examples are illustrative of the preparation of ester sulfonate compositions in accordance with the invention:

EXAMPLE III

A mixture of olefins having from 14 to 18 carbon atoms to the molecule, obtained by cracking paraffinic hydrocarbons, is reacted with carbon monoxide and water, in liquid phase, with the aid of a catalyst consisting essentially of a phosphoric acid-boron trifluoride-water complex. From the resulting reaction mixture there is separated by distillation a fraction consisting predominantly of tertiary alkane monocarboxylic acids having from 15 to 19 carbon atoms to the molecule. The mixed tertiary monocarboxylic acids so obtained are converted to their sodium salts by reaction with sodium hydroxide.

The mixture of sodium salts of $C_{15}$–$C_{19}$ tertiary monocarboxylic acids so obtained is reacted with an equimolar quantity of 3-chloro-2-hydroxypropane-1-sodium sulfonate at 130° to 140° C. in the presence of dimethyl formamide as solvent.

After six hours the reaction mixture was allowed to cool and the sodium chloride formed was then filtered off. After that the amide is removed by distillation; the residue is redissolved in a mixture of 20% by volume of isopropyl alcohol and 80% by volume of water and after acidification with sulphuric acid the non-converted materials are extracted with a mixture of equal parts by volume of ether and pentane. After neutralization with sodium hydroxide, removal of inorganic salt from the solution by means of an additional amount of isopropyl alcohol and removal of the solvent by distillation, the desired hydroxypropyl ester sulphonate composition, consisting essentially of an admixture of $C_{15}$–$C_{19}$ alkane tertiary monocarboxylic acid esters of 2,3-dihydroxypropane-1-sodium sulfonate, is obtained as a solid in a yield of 92%.

EXAMPLE IV

The foaming power of the composition consisting of $C_{15}$–$C_{19}$ alkane tertiary monocarboxylic acid esters of 2,3-dihydroxypropane-1-sodium sulfonate of foregoing Example I, identified herein as composition "A," was determined by means of the following test. Two solutions were prepared, both containing the hydroxypropyl ester sulphonate, compositions "A," in a concentration of 0.5 gram per liter; one containing in addition 0.05% of $Na_2SO_4$, and the other containing 0.8% of sodium pyrophosphate and 0.7% of $Na_2SO_4$. The first solution, to be referred to as solutilon (a), may be considered as being "unbuilt," the second solution, to be referred to as solution (b), as being "heavily built." Both solutions were prepared using water with a hardness of 18 English degrees. Amounts of 100 ml. of the solutions were subjected to shaking at 45° C. during 10 seconds in a vessel of standard size and form so as to effect abundant formation of foam, and then "titrated" in the same vessel at 45° C. by adding 0.2-ml. portions of a mixture of 15% of neutral tallow, 15% of flour, 0.5% of sodium chloride and 69.5% of distilled water until the height of the layer of foam had been reduced to 0.5 cm. For comparison two standard solutions of surface-active agents, viz. a solution of a mixture of sodium salts of secondary alkyl sulphates with from 8 to 18 carbon atoms and mainly straight chains, and a solution of a sodium dodecylbenzene sulphonate derived from the tetramer of propene, were "titrated" in the same way. The first of the standard solutions is compared with solution (a), the second with (b). The foaming power numbers of solutions (a) and (b) were found by dividing the number of milliliters of titration liquid required for the solutions (a) and (b) with that required for the titration of the corresponding standard solutions, respectively, and multiplying the quotients by 100. Solution (a) was found to have a foaming power number of 83 and solution of (b) a foaming power number of 116.

EXAMPLE V

A hydroxypropyl ester sulfonate composition, identified herein as composition "B," consisting essentially of $C_{17}$-alkane tertiary monocarboxylic acid ester of 2,3-dihydroxypropane-1-sodium sulfonate is prepared in the manner described in the foregoing Example III; the sodium salt of alkane tertiary monocarboxylic acid having 17 carbons to the molecule and 3-chloro-2-hydroxypropane sodium sulfonate constituting the reactants.

The stability, particularly with respect to hydrolysis, of composition "B" was determined by heating an aqueous 21% solution thereof to which 1% borax (based on the ester sulfonate) had been added, at 70° C. for 14 days at a pH of 8. For the purpose of comparison two additional solutions "B" and "C" were subjected to the same test. Solution "B" was prepared by substituting the corresponding tertiary monocarboxylic acid ester of 2,3-dihydroxypropane-1-sodium sulfate for the sulfonate ester. Solution "C" was prepared by replacing the ester sulfonate of solution "A" with a $C_{17}$ secondary alkyl sodium sulfate. Results obtained are indicated in the following Table I:

Table I

| Duration of heating at 70° C., hours | Active Material Unchanged, Percent | | |
|---|---|---|---|
| | Solution composition "A" | Solution composition "B" | Solution composition "C" |
| 3 | 100 | 100 | 100 |
| 5 | 100 | 100 | 100 |
| 22 | 100 | 100 | 98 |
| 99 | 100 | 100 | 97 |
| 122 | 100 | 100 | 97 |
| 166 | 100 | 98 | 84 |
| 200 | 100 | 91 | 80 |
| 270 | 100 | 43 | 41 |

EXAMPLE VI

A composition consisting essentially of an admixture of $C_{15}$–$C_{16}$ alkane tertiary monocarboxylic acid esters of 2,3-dihydroxypropane sodium sulfonate is prepared as follows. An olefin fraction containing olefins of 14 to 18 carbon atoms obtained by cracking paraffins is reacted with carbon monoxide and water in the presence of a catalyst complex consisting of phosphoric acid, boron trifluoride and water in molar ratio of 1:1:1, to obtain a reaction product consisting of a mixture of alkane tertiary monocarboxylic acids having from 15 to 19 carbon atoms to the molecule. The mixture of tertiary acids is fractionated to obtain a $C_{15}$–$C_{16}$ fraction and a $C_{18}$–$C_{19}$ fraction.

The $C_{15}$–$C_{16}$ fraction of alkane tertiary monocarboxylic acids is neutralized with aqueous sodium hydroxide to convert it to a mixture of sodium salts of alkane tertiary monocarboxylic acids having 15 to 16 carbon atoms. The resulting mixture of sodium salts of $C_{15}$–$C_{16}$ tertiary alkanoic acids is reacted with a substantially equimolar amount of 3-chloro-2-hydroxypropane sodium sulfonate in the presence of dimethylformamide as solvent at 130–140° C. thereby obtaining a reaction mixture containing a composition consisting of a mixture of sodium salts of $C_{15}$–$C_{16}$ tertiary alkanoic acid esters of 2,3-dihydroxypropane-1-sodium sulfonate. The composition is freed of inorganic salt by-product by filtration, and of the solvent by distillation. The composition is purified as described in foregoing Example III.

EXAMPLE VII

A hydroxy sulfonate ester composition consisting of a mixture of sodium salts of $C_{18}$–$C_{19}$ tertiary alkanoic monocarboxylic acid esters of 2,3-dihydroxypropane-1-sodium sulfonate is prepared by reacting the $C_{18}$–$C_{19}$ tertiary alkanoic acid fraction prepared in Example VI with 3-chloro-2-hydroxypropane-1-sodium sulfonate under the conditions described in the foregoing Example VI.

Similarly prepared are the K, Li, Ca and Mg salts of the mixed tertiary alkanoic monocarboxylic acid esters of 2,3-dihydroxypropane sulfonic acids and of the mixed tertiary alkanoic monocarboxylic acid esters of alkyl-substituted 2,3-dihydroxypropane sulfonic acids.

By the terms tertiary alkanoic carboxylic acid, alkane tertiary carboxylic acid and alkane tertiary monocarboxylic acid, as used herein and in the attached claims, it is intended to mean that the organic acids so referred to contain a quaternary carbon atom directly attached to the carbon atom of the carboxyl group.

We claim as our invention:

1. The process for the production of surface active compounds which comprises reacting a member of the group consisting of the alkali metal and alkaline earth metal salts of a tertiary alkanoic acid having from 5 to about 21 carbon atoms to the molecule with a sulfonate selected from the group consisting of the alkali metal and alkaline earth metal halogen-substituted hydroxy-alkane sulfonates having from 3 to about 22 carbon atoms to the molecule, at a temperature of from about 50 to about 250° C.

2. The process for the production of surface active compounds which comprises reacting an alkali metal salt of a tertiary alkanoic acid having from 5 to about 21 carbon atoms to the molecule with an alkali metal chlorine-substituted hydroxy-alkane sulfonate having from 3 to about 22 carbon atoms to the molecule, at a temperature of from about 100 to about 200° C.

3. The process for the production of surface active compounds which comprises reacting the sodium salt of a tertiary alkanoic acid having from 5 to about 21 carbon atoms to the molecule with a chloro-hydroxyalkane sodium sulfonate having from 3 to about 22 carbon atoms to the molecule.

4. The process for the production of surface active compounds which comprises reacting the sodium salt of a tertiary alkanoic acid having from 5 to about 21 carbon atoms to the molecule with a chloro-hydroxypropane sodium sulfonate at a temperature of from about 100 to about 200° C.

5. The process for the production of a surface active compound which comprises reacting sodium trimethylacetate with 3-chloro-2-hydroxypropane sodium sulfonate, at a temperature of from about 100 to about 200° C.

6. The process for the production of a surface active composition which comprises reacting a mixture of salts selected from the group consisting of the alkali metal and alkaline earth metal salts of tertiary alkanoic acids having from 7 to about 21 carbon atoms to the molecule with a member of the group consisting of the alkali metal and alkaline earth metal halogen-substituted hydroxy-alkane sulfonates having from 3 to about 22 carbon atoms to the molecule, at a temperature of from about 50 to about 250° C.

7. The process for the production of a surface active composition which comprises reacting a mixture of alkali metal salts of tertiary alkanoic acids having from 7 to about 21 carbon atoms to the molecule with a 3-chloro-2-hydroxypropane alkali metal sulfonate, at a temperature of from about 100 to about 200° C.

8. The process for the production of a surface composition which comprises reacting a mixture of sodium salts of tertiary alkanoic acids having from 7 to about 21 carbon atoms to the molecule with 3-chloro-2-hydroxypropane sodium sulfonate, at a temperature of from about 100 to about 200° C.

9. The surface active compounds having the general formula:

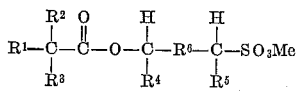

wherein:
$R^1$, $R^2$, $R^3$ are each an alkyl group;
the total number of carbon atoms in $R^1+R^2+R^3$ has a value of from 3 to about 21;
$R^6$ represents a member of the group consisting of alkylene and hydroxy-alkylene radicals having from 1 to 8 carbons;
$R^4$ and $R^5$ are each a member of the group consisting of alkyl, hydroxyalkyl, and hydrogen;
the total number of carbon atoms in $R^4+R^5+R^6$ has a value of from 1 to about 20, and only one of the $R^4$, $R^5$ and $R^6$ groups has a hydroxy substituent; and
Me is a member of the group consisting of the alkali metals, alkaline earth metals, hydrogen and $NH^4$.

10. The surface active compounds represented by the general formula:

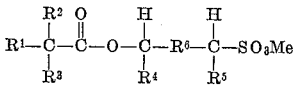

wherein:
$R^1$, $R^2$, $R^3$ are each an alkyl group;
the total number of carbon atoms in $R^1+R^2+R^3$ has a value of from 3 to about 21;
$R^4$ and $R^5$ are each a member of the group consisting of alkyl and hydrogen;
$R^6$ represents a hydroxy-alkylene radical having from 1 to 8 carbons;
the total number of carbon atoms in $R^4+R^5+R^6$ has a value of from 1 to about 20;
Me represents an alkali metal.

11. The surface active compounds represented by the general formula

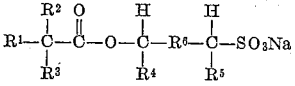

wherein:
$R^1$, $R^2$, $R^3$ are each an alkyl group;
the total number of carbon atoms in $R^1+R^2+R^3$ has a value of from 3 to about 21;
$R^4$ and $R^5$ are each a member of the group consisting of alkyl and hydrogen;
$R^6$ represents a hydroxy-alkylene radical having from 1 to 8 carbons;

the total number of carbon atoms in $R^4+R^5+R^6$ has a value of from 1 to about 20.

12. The surface active compounds of the general formula

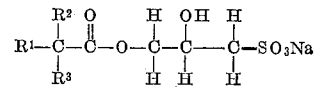

wherein:
$R^1$, $R^2$, $R^3$ are each an alkyl group;
the total number of carbon atoms in $R^1+R^2+R^3$ has a value of from about 3 to about 21;
$R^4$ and $R^5$ are each a member of the group consisting of alkyl and hydrogen.

13. The trimethyl acetic acid ester of 2,3-dihydroxypropane sodium sulfonate.

14. The surface active compositions consisting essentially of mixtures of tertiary alkanoic acid esters of sulfonates having the general formula

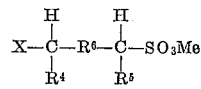

wherein:
$R^4$ and $R^5$ represent a member of the group consisting of alkyl, and hydrogen;
$R^6$ represents a hydroxy-alkylene radical having from 1 to 8 carbons;
the total number of carbons in $R^4+R^5+R^6$ has a value of 1 to about 20;
Me is a member of the group consisting of the alkali and alkaline earth metals; and
X represents a halogen;

obtained by the reaction of said sulfonate with a member of the group consisting of alkali metal and alkaline earth metal salts of mixtures of tertiary alkanoic acids having from 5 to 21 carbon atoms to the molecule.

15. The surface active compositions consisting essentially of admixed tertiary alkanoic acid esters of 2,3-dihydroxy-propane alkali metal sulfonate, derived from a mixture of tertiary alkanoic acids having from 15 to 16 carbon atoms to the molecule boiling in the range of from about 320 to about 340° C.

16. The surface active compositions consisting essentially of a mixture of tertiary alkanoic acid esters of 2,3-dihydroxy-propane sodium sulfonate derived from a mixture of tertiary alkanoic acids having from 18 to 19 carbon atoms to the molecule and a boiling temperature of from about 350° to about 370° C.

17. The surface active composition consisting essentially of tertiary alkanoic acid esters of 2,3-dihydroxy-propanoic sodium sulfonate derived from tertiary alkanoic acids having 17 carbon atoms to the molecule and boiling in the range of from about 335 to about 350° C.

References Cited in the file of this patent
UNITED STATES PATENTS

| | | |
|---|---|---|
| 1,881,172 | Daimler et al. | Oct. 4, 1932 |
| 2,876,241 | Koch et al. | Mar. 3, 1959 |